United States Patent [19]

Aikawa

[11] Patent Number: 4,853,799
[45] Date of Patent: Aug. 1, 1989

[54] MAGNETIC DISK APPARATUS CAPABLE OF WRITING AT TWO DIFFERENT TRACK DENSITIES

[75] Inventor: Shinichi Aikawa, Mitaka, Japan
[73] Assignee: Teac Corporation, Tokyo, Japan
[21] Appl. No.: 61,694
[22] Filed: Jun. 12, 1987

[30] Foreign Application Priority Data

Jun. 16, 1986 [JP] Japan ................... 61-139738

[51] Int. Cl.$^4$ ............... G11B 5/09; G11B 5/03; G11B 21/10
[52] U.S. Cl. ...................... 360/48; 360/66; 360/77.07
[58] Field of Search ............ 360/48, 66, 118, 61, 360/77

[56] References Cited

U.S. PATENT DOCUMENTS 4,622,601 11/1986 Isozaki et al. ................. 360/118

Primary Examiner—Vincent P. Canney
Attorney, Agent, or Firm—Woodcock, Washburn, Kurtz, Mackiewicz & Norris

[57] ABSTRACT

A disk drive capable of data transfer with a magnetic disk at, say, 192 tracks per inch (tpi) is made compatible with a 96 tpi disk drive. The 192 tpi disk drive comprises a magnetic head assembly having both a read/write head and a pair of tunnel erase heads. During writing at 192 tpi the tunnel erase heads are held out of operation, making it possible for the read/write head to form data tracks at the high density required. The tunnel erase heads are automatically switched on and held in operation during writing at 96 tpi, for erasing the edge portions of each data track being created by the read/write head. Thus, even if the disk on which data is to be written at 96 tpi bears old data tracks that have been prerecorded by a 96 tpi disk drive, such old data tracks will be completely erased by the pair of tunnel erase heads as the 192 tpi disk drive rewrites thereon at 96 tpi. So rewritten, the disk can be read by either the 192 or 96 pti disk drive.

3 Claims, 4 Drawing Sheets

MAGNETIC DISK APPARATUS CAPABLE OF WRITING AT TWO DIFFERENT TRACK DENSITIES

BACKGROUND OF THE INVENTION

My invention relates to apparatus for data transfer with magnetic storage media such as those commonly known as floppy disks, and more specifically to such apparatus capable of writing on a magnetic disk at two different track densities (i.e., different numbers of tracks per unit distance in a radial direction of the disk). Typically, one of the two track densities is 96 tracks per inch (tpi), and the other is a double density of 192 tpi, although I envisage within my invention any such two track densities that one is an integral submultiple of the other.

A variety of track densities have now been standardized, among them being 96 tpi and 192 tpi, and magnetic disk drives for such various track densities are available on the market. Usually, 96 tpi disk drives employ magnetic head assemblies of the tunnel erase or equivalent type for trimming the opposite edges of each record track as data is written thereon. This type of head asemblies are not used with 192 tpi disk drives; instead, for the required higher track density, this type of disk drive incorporates a close loop servo system using embedded servo patterns on the magnetic disk. The servo patterns or bursts enable the electronics of the 192 tpi disk drive to constantly update the position of the head assemblies, compensating for any thermal hygroscopic expansion or contraction of the disk. The servo system is generally believed to reduce the possibility of head mistracking to a minimum, making it possible to accurately read data from tracks which have not been trimmed and which are held close to each other. Reference may be had to "Kodak 3.3 Flexible 5¼" "Disk Drive" published Apr. 18, 1984, by Data Technology Corporation for further details on 192 tpi disk drives employing the embedded servo system for accurate head positioning and track following.

I am aware that the 192 tpi disk drive has been compatible with the 96 tpi drive, as the former has been adapted for 96 tpi by writing on only the odd- or even-numbered ones of 192 tpi tracks. The 96 tpi disk thus formed by the 192 tpi drive can be read by the same 192 tpi device without any difficulties.

A problem does, however, arise when the 96 and 192 tpi disk drives are put to use in the following manner. Let us assume that the 96 tpi drive writes on a disk. Part or all of the data thus written at 96 tpi is then rewritten by the 192 tpi drive that has been adapted for the 96 tpi capability. Then the rewritten disk is read by the 96 tpi drive. During the rewriting of the 96 tpi data by the 192 tpi drive, as heretofore constructed, the old data has not been completely erased because of the difference in width between 96 tpi tracks and 192 tpi tracks. Typically, 96 tpi tracks are 155 micrometers in width whereas 192 tpi tracks are 119 micrometers in width, so that 36 micrometers of each old 96 tpi data tracks is left unerased. When this rewritten disk is read by the 96 tpi disk drive, its read/write head unavoidably scans not only the new data tracks but also the incompletely erased old tracks.

SUMMARY OF THE INVENTION

I have hereby invented an improved apparatus capable of writing on a magnetic disk at two different track densities without the noted difficulties encountered heretofore.

Briefly, my invention may be summarized as a data transfer apparatus capable of writing on a magnetic disk at first and second track densities, the second track density being an integral multiple of the first track density. The apparatus comprises a magnetic head assembly of the tunnel erase or any other comparable type having both a write head for writing on the magnetic disk by creating concentric data tracks thereon, and erase head means so arranged with respect to the write head as to erase a pair of opposite edge portions of each data track created by the write head. A head positioning means is provided for incrementally transporting the head assembly in a radial direction of the magnetic disk, the head positioning means being capable of transporting the head assembly at such increments that the write head can create the data tracks at a selected one of the first and second track densities. Also included is a switch means for holding the erase head means in operation when the write head is writing on the magnetic disk at the first track density, and for holding the erase head means out of operation when the write head is writing at the second track density.

In a preferred embodiment the data transfer apparatus of the above summarized construction takes the form of a 192 tpi disk drive additionally comprising a closed loop embedded servo system for accurate head positioning. The switch means holds the erase coil of the head assembly unenergized during writing at 192 tpi, so that the data tracks can be formed close to one another for the required high density, it being unnecessary to provide any large intervening spaces to be scanned by the erase head means. During writing at 96 tpi, on the other hand, the erase coil is energized for tunnel erasing the opposite edge portions of each data track being written on the disk.

Possibly, this same magnetic disk may bear old data tracks that have been prerecorded by a 96 tpi disk drive. Such old 96 tpi data tracks will be completely erased as the 192 tpi disk drive of my invention rewrites thereon at 96 tpi, with the erase coil held energized as aforesaid during such rewriting. The magnetic disk so rewritten at 96 tpi by the 192 tpi disk drive of my invention can then be read by the 96 tpi disk drive without any such difficulties as have been pointed out in connection with the prior art.

The above and other features and advantages of my invention and the manner of realizing them will become more apparent, and the invention itself will best be understood, from a study of the following description and appended claims, with reference had to the attached drawings showing some preferred embodiments of my invention.

DESCRIPTION OF THE PREFERRED EMBODIMENTS

Figure 1:
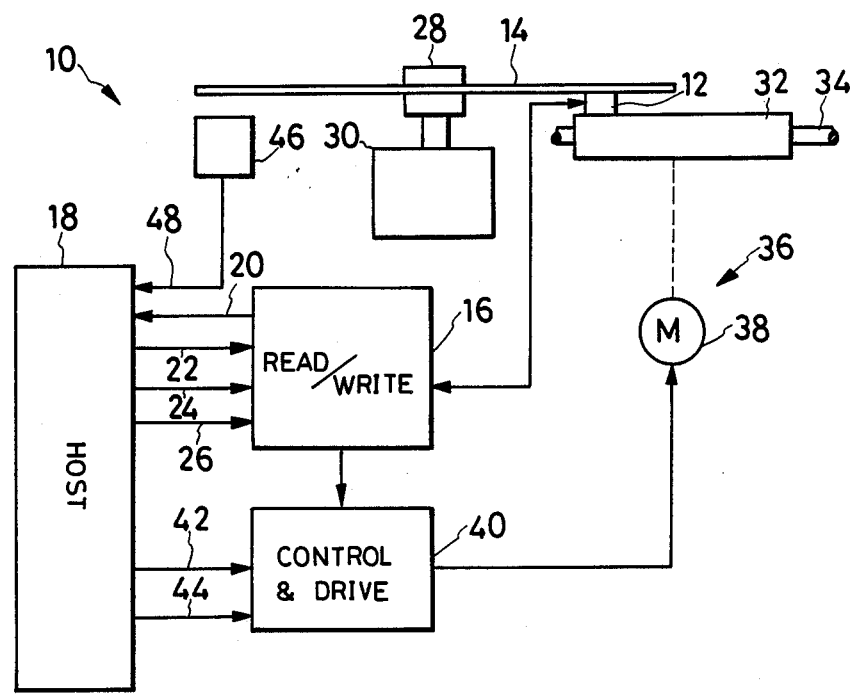
FIG. 1 is a schematic representation of some essential parts of the 192 tpi disk drive for use in the practice of my invention, shown together with a block diagram of the electronic circuitry associated with the disk drive.

I have illustrated in FIG. 1 the mechanical and electrical configuration of a 192 tpi disk drive 10, forming a preferred embodiment of my invention, insofar as is necessary for a full understanding of the invention. I assume for the convenience of description that the disk drive 10 is of single sided construction, having but one magnetic head assembly 12 for data transfer with only one side of a flexible magnetic disk 14. A read/write circuit 16 is connected to the head assembly 12 for controlling its data transfer with the disk 14 under the direction of a host system 18 external to the disk drive 10. The read/write circuit 16 is interfaced with the host 18 via lines 20, 22, 24 and 26, as will be later explained in more detail with reference to FIG. 5.

As is conventional with this type of disk drive, the magnetic disk 14 is caught fast by a clamping mechanism 28 in registration with a direct drive electric motor 30. The rotation of the drive motor 30, and therefore of the disk 14, is also controlled by the host 18 via an internal control and drive circuit which is not shown because of its well known nature and of its impertinence to my invention.

The head assembly 12 is conveniently mounted on a head carriage 32 movable along a guide rod or rods 34 for transporting the head assembly radially of the disk 14. A head positioning mechanism 36 comprising a head positioning motor 38 of the electric, bidirectional stepping type is coupled to the head carriage 32 via a conventional motion translating mechanism, not shown, for incrementing the head carriage back and forth along the guide rod or rods 34. The stepper motor 38 is connected to a control and drive circuit 40 thereby to be controllably driven under the direction of the host 18. The stepper motor control and drive circuit 40 is interfaced with the host 18 via a DIRECTION line 42 and STEP line 44. The DIRECTION line 42 dictates the movement of the head asesmbly 12 toward or away from the center of the disk 14 when the STEP line 44 is pulsed.

At 46 in FIG. 1 is shown a track density sensor for optically discriminating between the 96 or 192 tpi track density of each loaded magnetic disk, or disk cartridge, from a peripheral cutout in its jacket. The track density sensor 46 is connected to the host 18 via a TRACK DENSITY line 48.

Figure 2:
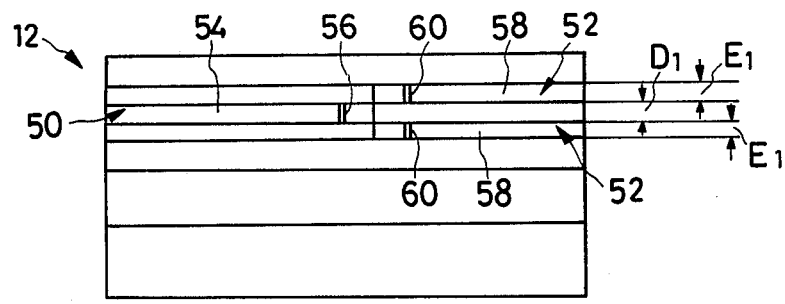
FIG. 2 is an enlarged plan view of the magnetic head assembly used in the 192 tpi disk drive of FIG. 1 as seen from the disk side.
Figure 3:
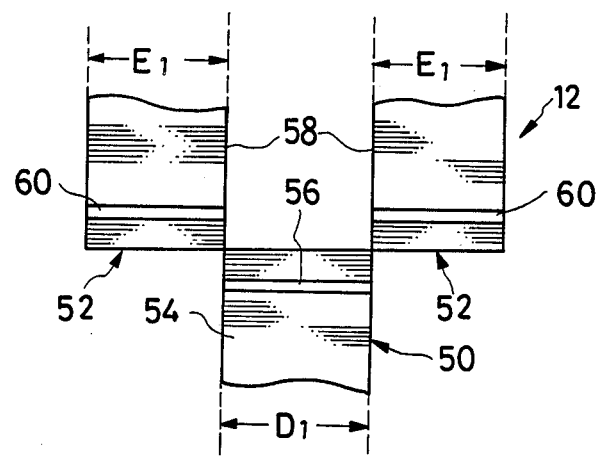
FIG. 3 is a still more enlarged, fragmentary plan view of the 192 tpi magnetic head assembly of FIG. 2.

As illustrated on an enlarged scale in FIG. 2 and on a still more enlarged scale in FIG. 3, the magnetic head assembly 12 of the 192 tpi disk drive 10 is herein shown to be of the tunnel erase configuration comprising a read/write head 50 and a pair of tunnel erase heads 52, with the latter disposed on both sides of the former for trimming off the opposite edge portions of each data track created by the read/write head. The read/write head 50 has a magnetic core 54 defining a read/write gap 56 which is dimensioned to provide a data track width D1 of, say, 119 micrometers in this particular embodiment. Each erase head 52 also has a magnetic core 58 defining an erase gap 60 which is dimensioned to provide an erase width E1 of, say, 121 micrometers. As is well known to those skilled in the disk drive art, the track width D1 and erase width E1 do not exactly equal the longitudinal dimensions of the read/write gap 56 and erase gaps 60, respectively. For the simplicity of description, however, I have indicated in FIGS. 2 and 3 as if the widths D1 and E1 were exactly equal to the longitudinal dimensions of the gaps 56 and 60, as I believe that such showings will invite not significant misunderstanding of my invention.

Figure 4:
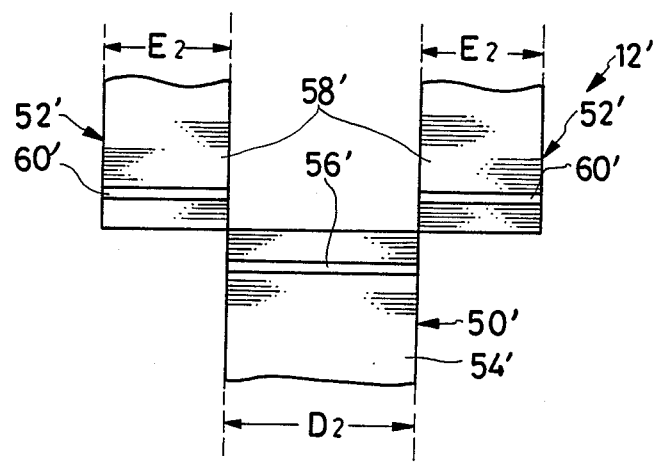
FIG. 4 is a view similar to FIG. 3 but showing a magnetic head assembly of a 96 tpi disk drive compatible with the 192 tpi disk drive of FIG. 1.

Shown in FIG. 4 for its particular pertinence to my invention is a tunnel erase head assembly 12' of a standard 96 tpi disk drive compatible with the 192 tpi disk drive 10 of FIG. 1. The 96 tpi head assembly 12' is similar in construction with the 192 tpi head assembly 12 of FIGS. 2 and 3, comprising a read/write head 50' with a read/write gap 56' formed in its core 54', and a pair of tunnel erase heads 52' each having an erase gap 60' formed in its core 58'. However, the longitudinal dimensions of these gaps 56' and 60' differ from those of the corresponding gaps 56 and 60 of the 192 tpi head assembly 12. The longitudinal dimension D2 of the read/write gap 56' is 160 micrometers, providing a data track width of 155 micrometers. The longitudinal dimension E2 of each erase gap 60' is 100 micrometers.

Speaking more broadly, I recommend that the erase width E1 of each erase head 52 of the 192 tpi head assembly 12, FIGS. 2 and 3, be in the range of (D2−D1)/2 to (Pb−D1), where Pb is the pitch of tracks formed by the 192 tpi head assembly 12.

Figure 5:
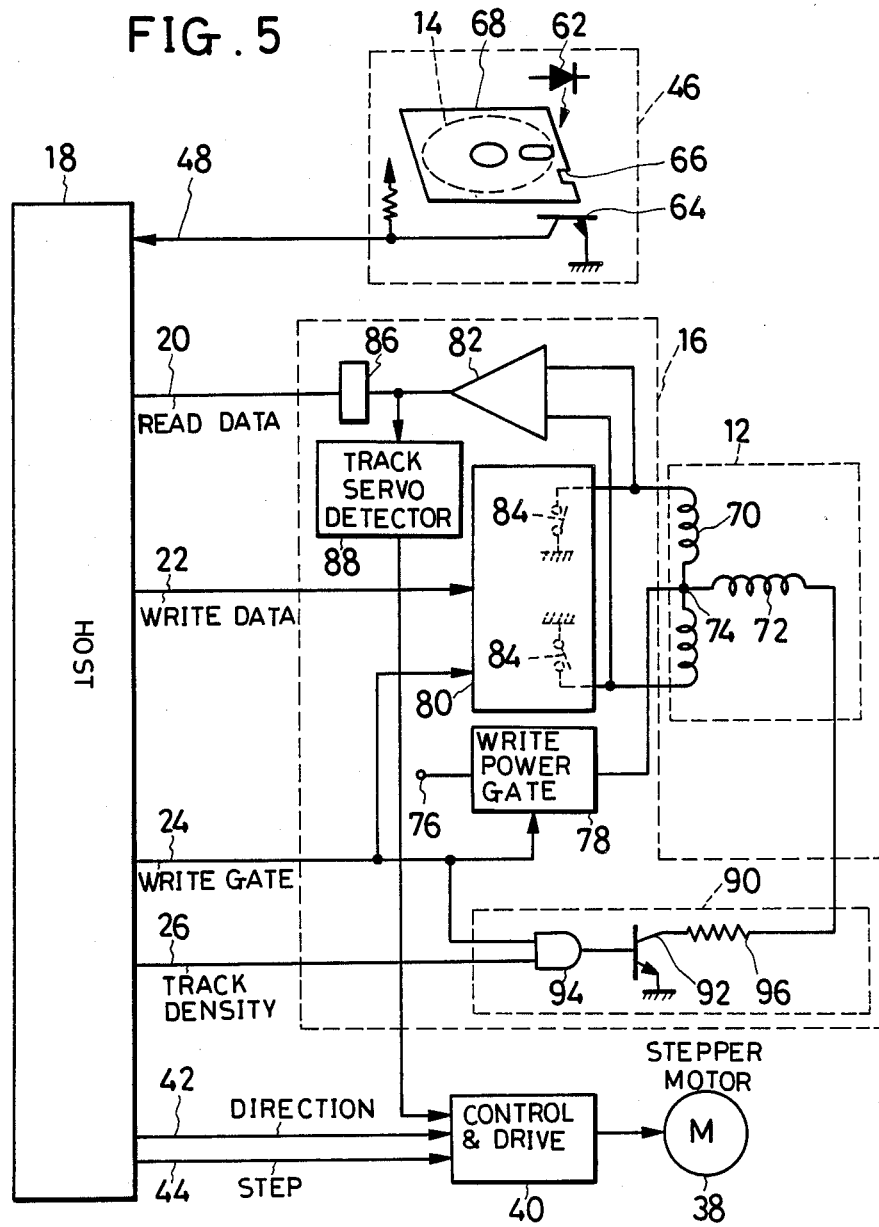
FIG. 5 is a schematic electrical diagram showing in more detail the circuitry associated with the 192 tpi disk drive of FIG. 1.

Reference is now directed to FIG. 5 for a study of a more detailed configuration of the circuitry of the 192 tpi disk drive 10 of FIG. 1. The track density sensor 46 is a combination of a light source 62 and a photodetector 64, arranged to sense the presence or absence of a cutoff 66 in a jacket 68 enveloping the magnetic disk 14. The photodetector 64 is electrically connected to the host 18 via the TRACK DENSITY line 48. Low and high logic levels on this line 48 indicate that the loaded disk 14 is intended for data transfer at 96 tpi and 192 tpi, respectively.

The magnetic head assembly 12 comprises a read/write coil 70 wound on the core 54, FIGS. 2 and 3, and a common erase coil 72 wound on the cores 58. The read/write coil 70 is center tapped at 74 for connection to one extremity of the erase coil 72 on one hand and, on the other hand, to a direct current supply terminal or write current source 76 via a write power gate 78. It is thus seen that when the write power gate 78 is enabled by the WRITE GATE signal on the line 24, at least the read/write coil 70 is fed from the supply terminal 76. The erase coil 72 may, or may not, be energized depending upon the track density at which data is to be written on the loaded disk 14, as will become apparent as the description proceeds.

The read/write coil 70 has it opposite extremities coupled to both write circuit 80 and differential amplifier 82. The write circuit 80 inputs from the host 18 both write data over the line 22 and a write gate signal over the line 24. When enabled by the WRITE GATE signal on the line 24, the write circuit 80 has its pair of switching elements 84 alternately turned on and off as dictated by the write data one the line 22 thereby causing write current to be reversed through the read/write coil 70.

The differential amplifier 82 has its output connected to a read data forming circuit 86 which in turn is interfaced with the host 18 via the READ DATA line 20. The read data recovered from the disk 14 by the read/write coil 70 is thus output to the host system in the same form as it was received on the WRITE DATA line 22. A track servo detector circuit 88 is also connected to the output of the differential amplifier 82 for deriving the track servo signal contained in the output therefrom. The output of this circuit 88 is connected to the stepping motor control and drive circuit 40.

Shown enclosed in a dashed block designated 90 is an erase coil switching circuit comprising a switching transistor 92 and an AND gate 94. The transistor 92 has its collector connected to the erase coil 72 via a resistor 96, its emitter grounded, and its base connected to the AND gate 94. This AND gate has two inputs, one connected to the WRITE GATE line 24 and the other to the TRACK DENSITY line 26.

Operation

When data is to be written on the magnetic disk 14 at 192 tpi by the disk drive 10, the output from the track density sensor 45 will be high. In response to this high input the host 18 will hold low the TRACK DENSITY signal on the line 26. Since then the output from the AND gate 94 of the erase coil switching circuit 90 will also be low, the switching transistor 92 will be nonconductive. Enabled by the WRITE GATE signal on the line 24, the write power gate 78 will electrically connect both read/write coil 70 and erase coil 72 of the head assembly 12 to the supply terminal 76. However, as the switching transistor 92 is nonconductive as aforesaid, the erase coil 72 will not be energized. Only the read/write coil 70 will be energized as controlled by the write circuit 80 in accordance with the write data on the line 22. The host 18 will also deliver the DIRECTION signal and STEP signal over the lines 42 and 44 to the stepper motor control and drive circuit 40 for causing the head positioning mechanism 36 to step the head assembly 12 to successive desired positions in a radial direction on the magnetic disk 14.

Figure 6:
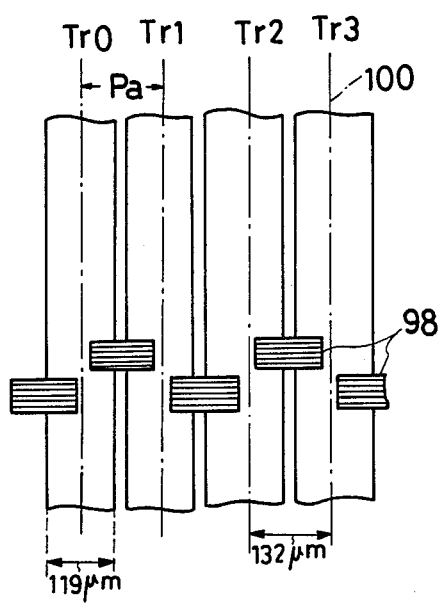
FIG. 6 is a fragmentary, schematic representation of data tracks, as well as track servo patterns, formatted on the magnetic disk at 192 tpi by the 192 tpi disk drive of FIG. 1.

The magnetic disk 14 may be either preformatted, complete with servo data, or formatted by the user. I have indicated in FIG. 6 the first four tracks, consisting of Track Zero TrO, Track One Tr1, Track Two Tr2 and Track Three Tr3, formed on the disk 14 at 192 tpi. The pitch Pa of these 192 tpi tracks is 132 micrometers in this particular embodiment. Track servo patterns 98 are recorded one-half track off in either direction of the center line 100 of each track. Each time the servo patterns 98 are detected by the circuit 88, the control and drive circuit 40 will actuate the stepper motor 38 to an extent necessary to reposition the head assembly 12 to the center line of the track. The closed loop servo system using the embedded servo data for holding the head assembly in precise alignment with the tracks is standard with 192 tpi disk systems for use with both flexible and rigid magnetic disks, so that no more detailed disclosure of the servo system is believed necessary. Further information may be had from the previously cited publication by Data Technology Corporation.

Since the pair of erase heads 52 of the head assembly 12 are out of operation during writing at 192 tpi, the read/write head 50 will create data tracks to the full width of 119 micrometers, the opposite edges of each track being not trimmed off. Therefore, as will be observed from FIG. 6, the data tracks can be formed with the minimal intervening spaces therebetween required for the high track density. In the illustrated embodiment the pitch of the 192 tpi data tracks is only 132 micrometers.

During reading, too, the head assembly 12 is accurately positioned on and follows the data tracks on the disk 14 through the same servo system as during writing. The WRITE GATE signal on the line 14 is at a low logic level during reading, holding the write power gate 78 off and the AND gate 94 low. No write current will therefore be fed to either read/write coil 70 or erase coil 72.

Let us suppose that the magnetic disk 14 that has been loaded in the 192 tpi disk drive 10 has data prerecorded thereon by a 96 tpi disk drive having the head assembly 12' of FIG. 4. Although I have not shown all but the head assembly 12' of the 96 tpi disk drive, it will be seen that this disk drive can be of conventional design, all that is required being that it be capable of writing at 96 tpi on the same magnetic disk as used by the 192 tpi disk drive 10.

Upon loading of the prerecorded 96 tpi disk in the 192 tpi disk drive 10, the track density sensor 46 will sense the peripheral cutout 66 in the disk jacket 68 and deliver to the host 18 a signal indicative of the 96 tpi track density. Thereupon the TRACK DENSITY line 26 will go high. Accordingly, if the WRITE GATE line 24 also goes high to dictate writing, the AND gate 94 of the erase coil switching circuit 90 will be enabled thereby causing conduction through the transistor 92. With the write power gate 78 also switched on by the write gate signal, not only the read/write coil 70 but also the erase coil 72 will be energized by the write current source 76. Thus, as the read/write head 50 of the 192 tpi head assembly 12 rewrites on the prerecorded disk 14, the pair of tunnel erase heads 52 of the head assembly 12 will trim the opposite edge portions of each data track being created by the read/write head.

Figure 7:
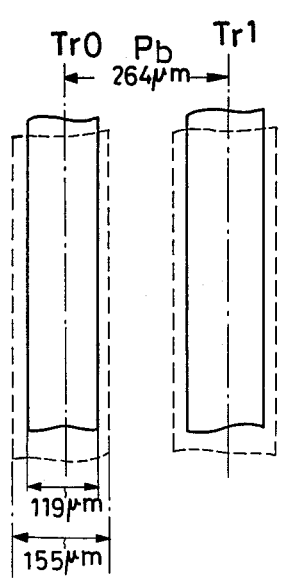
FIG. 7 is a fragmentary, schematic representation of data tracks formatted on the magnetic disk at 96 tpi by the 192 tpi disk drive of FIG. 1.

The dashed lines in FIG. 7 represent the old 96 tpi data tracks to be erased from the disk 14 by the 192 tpi head assembly 12. Each old 96 tpi data track has a width of 155 micrometers as aforesaid. Positioned in precise register with each old data track, the 192 tpi head assembly 12 will form a new data track, indicated by the solid lines in FIG. 7, to a width of only 119 micrometers by its read/write head 50. However, the opposite edge portions of each old data track will be completely erased by the pair of tunnel erase heads 52, which are now having their common erase coil 72 being energized from the current source 76 because of the 96 tpi mode operation of the disk drive 10. As has been set forth in connection with FIGS. 2 and 3, each erase head 52 of the 192 tpi head assembly 12 is dimensioned to provide an erase width E1 of 121 micrometers, which is sufficiently greater than the width, (155−119)/2, of each edge portion of each old data track left unerased by the read/write head 50. Of course, for rewriting on the old 96 tpi data tracks, the head assembly 12 are positioned on these tracks only, the pitch Pb (264 micrometers in the illustrated embodiment) of the 96 tpi tracks being twice the pitch Pa of the 192 tpi tracks of FIG. 6.

The new 96 tpi data tracks thus formed on the disk 14 can be read by the 96 tpi disk drive having the head assembly 12' of FIG. 4 without the noted difficulties encountered heretofore. Each new 96 tpi data track is 119 micrometers in width, whereas the read/write head 50' of the 96 tpi head assembly 12' having the read/write gap 56' of 160 micrometers in length. Further, since the old data has been thoroughly erased from the disk 14, only the new data will be read accurately. The track servo system is unnecessary for reading the new data by the 96 tpi disk drive.

Modifications

Figure 8:
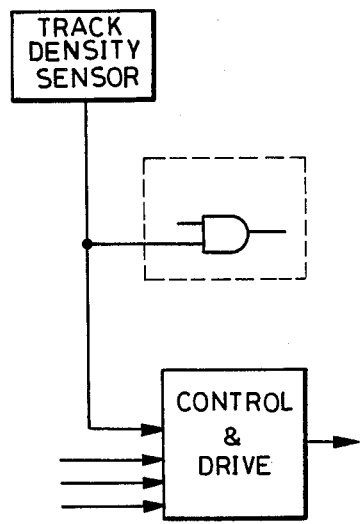
FIG. 8 is a block diagram of a slight modification of the circuitry of FIGS. 1 and 5.

FIG. 8 shows a slight modification of the above described embodiment, in which the track density sensor 46 has its output connected not to the host system 18 but directly to both the AND gate 94 of the erase head switching circuit 90 and to the stepper motor control and drive circuit 40. This circuit 40 may be modified to generate an internal stepping pulse in response to each external stepping pulse from the host 18 when the track density signal from the sensor 46 indicates 96 tpi, thereby driving the stepper motor 38 two steps with each incoming external stepping pulse. The other details of circuitry can be identical with those illustrated in FIG. 5 except that the modified disk drive need not be interfaced with the host 18 via the track density lines 26 and 48. The operation of the modified disk drive is also believed to be self evident from the foregoing operational description of the disk drive 10.

Despite the foregoing detailed disclosure I recognize that my invention could be embodied in other forms within the broad teaching hereof. The following is a brief list of possible modifications or alterations of the illustrated embodiments which I believe fall within the scope of my invention:

1. The two track densities in question need not be 96 and 192 tpi but may, for example, be 48 and 96 tpi, 135 and 405 tpi, etc., all that is required being that one track density by an integral multiple of the other.
2. The track servo system is dispensable in cases where the head assembly can be mechanically positioned to a required degree of accuracy.
3. The track density sensor is also dispensable if a signal indicative of either of the two different track densities is delivered to the erase coil switching circuit under manual control.
4. The stepper motor of the head positioning mechanism may be replaced by, for instance, a voice coil motor or like electromagnetic actuator.
5. The magnetic head assembly need not be of the laminated tunnel erase type but can be of any known or suitable configuration provided that it can erase the opposite edge portions of each data track.
6. The invention may be applied to disk drives of the type having a rigid magnetic disk or disks semipermanently mounted therein.

What I claim is:

1. A data transfer apparatus capable of writing either on a first magnetic disk at a first track density or on a second magnetic disk at a second track density which is an integral multiple of the first track density, only the second magnetic disk having track servo patterns prerecorded thereon, the apparatus comprising:

(a) disk drive means for imparting rotation to the first or second magnetic disk;
(b) a magnetic head assembly comprising a read/write head for reading and writing data on the magnetic disk by creating concentric data tracks thereon, and erase means so arranged with respect to the read/write head as to erase a pair of opposite edge portions of each data track created by the read/write head;
(c) an amplifier;
(d) a track servo detector circuit connected to the read/write head via the amplifier for detecting the track servo patterns on the second magnetic disk;
(e) head positioning means for incrementally transporting the head assembly in a radial direction of the magnetic disk, the head positioning means being capable of transporting the head assembly at such increments that the read/write head can create the data tracks at a selected one of the first and second track densities, the head positioning means being coupled to the track servo detector circuit for repositioning, as required, the head assembly on the data tracks on the second magnetic disk during data transfer therewith in response to the track servo patterns detected by the track servo detector circuit; and
(f) switch means for holding the erase head means in operation when the read/write head is writing on the first magnetic disk at the first track density, and for holding the erase head means out of operation when the read/write head is writing on the second magnetic disk at the second track density, so that only each data track being written on the first magnetic disk has its opposite edge portions erased by the erase head means.

2. A data transfer apparatus capable of, writing either on a first magnetic disk at a first track density or on a second magnetic disk at a second track density which is at least twice as high as the first track density, only the second magnetic disk having track servo patterns prerecorded thereon, the apparatus comprising:

(a) disk drive means for imparting rotation to the first or second magnetic disk;
(b) a magnetic head assembly comprising a read/write head having a read/write coil for reading and writing data on the magnetic disk by creating concentric data tracks thereon, and erase means having an erase coil and so arranged with respect to the read/write head as to erase a pair of opposite edge portions of each data track created by the read/write head;
(c) an amplifier;
(d) a track servo detector circuit connected to the read/write head via the amplifier for detecting the track servo patterns on the second magnetic disk;
(e) head positioning means for incrementally transporting the head assembly in a radial direction of the magnetic disk, the head positioning means being capable of so transporting the head assembly as to enable the read/write head to create the data tracks at a selected one of the first and second track densities, the head positioning means being coupled to the track servo detector circuit for repositioning, as required, the head assembly on the data tracks on the second magnetic disk during data transfer therewith in response to the track servo patterns detected by the track servo detector circuit;
(f) write gate signal input means for inputting a write gate signal directing the writing of data on the first or second magnetic disk by read/write head;
(g) track density signal input means for inputting a track density signal indicative of whether data is to be written at the first or second track density;

(h) power supply means;
(i) a write power gate connected between the power supply means and the read/write coil and also between the power supply means and the erase coil, the write power gate being responsive to the write gate signal for permitting the read/write and erase coils to be fed from the power supply means when the write gate signal dictates writing on the magnetic disk; and
(j) switch means connected to the erase coil and the write gate signal input means and the track density signal input means for permitting the erase coil to be fed from the power supply means when data is being written on the first magnetic disk at the first track density, and for preventing the erase coil from being fed from the power supply means when data is being written on the second magnetic disk at the second track density.

3. The data transfer apparatus of claim 2 wherein the switch means comprises:
(a) a switching element connected between the erase coil and ground; and
(b) a gate having a first input connected to the write gate signal input means, a second input connected to the track density signal input means, and an output connected to the switching element.

* * * * *

UNITED STATES PATENT AND TRADEMARK OFFICE
CERTIFICATE OF CORRECTION

PATENT NO.   :   4,853,799

DATED        :   August 1, 1989

INVENTOR(S)  :   Shinichi Aikawa

It is certified that error appears in the above-identified patent and that said Letters Patent is hereby corrected as shown below:

Col. 1, line 27, change "close" to --closed--.

Col. 4, line 63, change "it" to --its--.

Col. 5, line 2, change "one" to --on--.

Signed and Sealed this

Twenty-sixth Day of March, 1991

Attest:

HARRY F. MANBECK, JR.

*Attesting Officer*    *Commissioner of Patents and Trademarks*